A. M. BOLLINGER.
VEHICLE.
APPLICATION FILED DEC. 24, 1909.
974,547.
Patented Nov. 1, 1910.
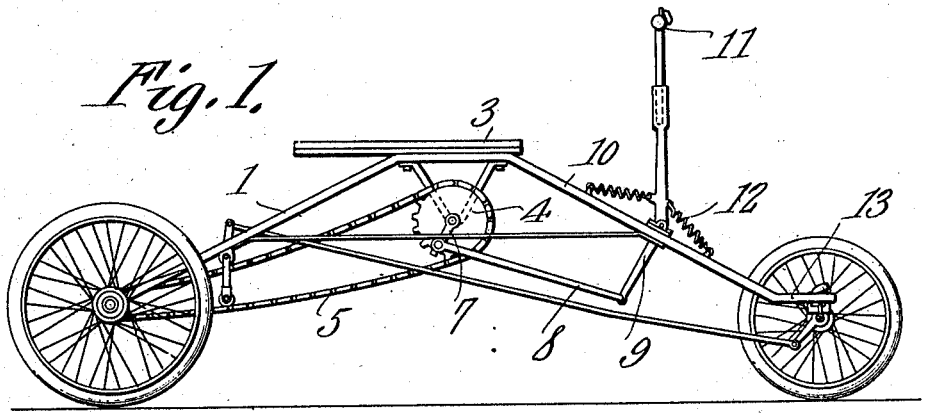
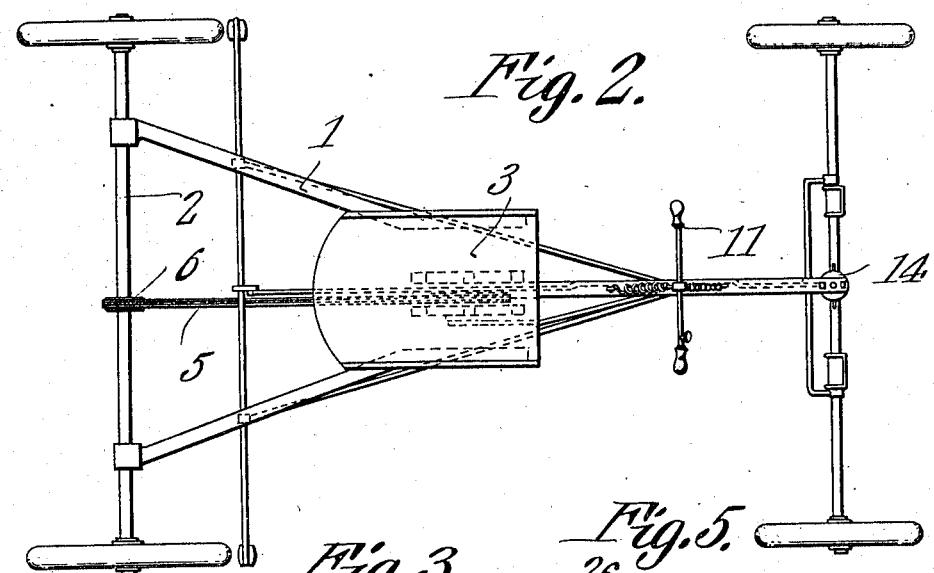
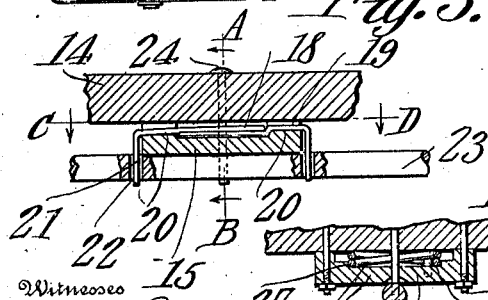
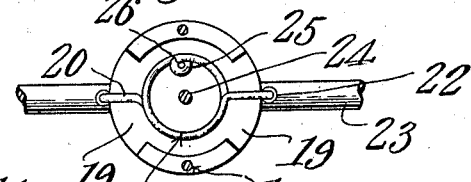
Inventor
Alexander M. Bollinger.
By C. A. Snow & Co.
Attorneys

UNITED STATES PATENT OFFICE.

ALEXANDER M. BOLLINGER, OF LEECHBURG, PENNSYLVANIA.

VEHICLE.

974,547.      Specification of Letters Patent.      Patented Nov. 1, 1910.

Application filed December 24, 1909. Serial No. 534,831.

*To all whom it may concern:*

Be it known that I, ALEXANDER M. BOLLINGER, a citizen of the United States, residing at Leechburg, in the county of Armstrong and State of Pennsylvania, have invented a new and useful Vehicle, of which the following is a specification.

This invention relates to vehicles of that type disclosed in Patent No. 844,319, issued to me on February 19, 1907, and which is designed for use by children and other persons and adapted to be propelled by the occupants.

In devices of this character such as heretofore devised and wherein the front or steering axle has been actuated by the feet of the occupant of the vehicle, the said axle has been unduly sensitive with the result that unexpected and sudden movements thereof often take place and cause either the overturning of the vehicle or a collision with an adjacent object.

One of the objects of the present invention is to provide yielding elastic means whereby the front axle can be held normally at right angles to the direction of travel of the vehicle, said means serving to automatically return the axle to its normal position immediately subsequent to any swinging action of the axle.

A still further object is to provide elastic means for maintaining the front axle in such position relative to the body of the vehicle as to cause the said vehicle to travel straight ahead when the feet of the occupant are removed from the axle.

With these and other objects in view the invention consists of certain novel details of construction and combinations of parts hereinafter more fully described and pointed out in the claims.

In the accompanying drawings the preferred form of the invention has been shown.

In said drawings:—Figure 1 is a side elevation of a vehicle embodying the present improvements. Fig. 2 is a plan view thereof. Fig. 3 is an enlarged vertical longitudinal section through the axle and its connection with the tongue of the vehicle. Fig. 4 is a section on line A—B Fig. 3. Fig. 5 is a section on line C—D Fig. 3.

Referring to the figures by characters of reference 1 designates the frame of the vehicle, the same being preferably triangular and mounted, at its rear end, on the wheel supported rear axle 2. A seat 3 is mounted on the upper portion of the frame and a driving sprocket 4 is supported below this seat and is connected by means of a chain 5 with a sprocket 6 secured to the axle 2. A crank 7 rotates the sprocket 4 and is connected, by means of a pitman 8, with the lower end of a lever 9, said lever being fulcrumed at an intermediate point, upon a tongue 10 which extends downwardly from the front portion of the frame 1. Handles 11 are arranged at the upper end of the lever so as to facilitate actuation thereof by the occupant of the vehicle. Springs 12 are preferably connected to the lever and extend in opposite directions therefrom, both of these springs being attached to the tongue 10.

A bearing extension 13 projects forwardly from the front end of the tongue 10 and terminates in a substantially circular enlargement 14 which bears downwardly on a disk 15, the said disk being secured in any suitable manner as by means of bolts 16, to the enlargement or extension 13—14. The upper face of disk 15 has a circular recess 17 which constitutes the seat for a coiled spring 18, the terminals of which extend normally in opposite directions and through notches or recesses 19 formed in opposite portions of the disk. Each of these terminal portions has been indicated at 20 and has a downwardly extended end 21 which is seated in an opening 22 formed in the front axle 23 of the vehicle. This front axle is engaged at its center by a king bolt 24 located within the centers of the disk 15 and the extension enlargement 14. The spring is held against rotation within recess 7 by an eye 25 into which projects a stud 26 extending from the disk 15. An annular shoulder 27 is formed upon the bottom of the recess 17 and surrounds the lower whirl of the spring so as to hold said spring against swinging movement about the stud 26.

It will be understood that under normal conditions the extensions of spring 18 will hold the front axle 23 at right angles to the direction of movement of the vehicle. It will be apparent therefore that when the axle is turned in either direction the spring will be placed under stress and will operate to return the axle to its normal position when the feet of the operator are removed therefrom. Moreover the spring, when under stress, assists the operator in returning the axle to its normal position should the feet be maintained thereon.

By providing a controlling spring such as described the vehicle is rendered especially adapted for coasting because, after it has once been set to travel on a straight line in a predetermined direction, the spring will maintain the axle in fixed relation to the body under normal conditions and, should the axle be shifted out of its normal position by any object, such as a stone or the like, the spring will promptly restore the axle to its normal position relative to the vehicle body and overturning of the vehicle or a collision with an object outside of the proper path thereof, will thus be prevented.

It is of course to be understood that various changes may be made in the construction and arrangement of the parts without departing from the spirit or sacrificing any of the advantages of the invention, as defined in the appended claims.

What is claimed is:—

1. A vehicle including a frame having an extension, a steering axle, a recessed bearing element secured to the extension, a pivot device extending through the extension and element, a spring housed between said extension and element and coiled about the pivot device, means for securing the spring against rotation on said device, and means upon the spring and engaging the axle for holding said axle normally in a predetermined relation to the direction of travel of the vehicle, said axle being mounted on the pivot device.

2. A vehicle including fixedly connected elements, a pivot device extending therethrough, one of said elements being recessed, an axle upon the pivot device, a spring upon the pivot device and housed within the recessed element, said spring being held against rotation relative to said elements, and oppositely extending means upon the spring for engaging the axle to hold said axle normally in a predetermined relation to the direction of travel of the vehicle.

In testimony that I claim the foregoing as my own, I have hereto affixed my signature in the presence of two witnesses.

ALEXANDER M. BOLLINGER.

Witnesses:
JOHN D. VAN TASSEL,
EARL R. COGLEY.